(12) United States Patent
Shimoda

(10) Patent No.: US 8,772,656 B2
(45) Date of Patent: Jul. 8, 2014

(54) ACCELERATION SWITCH

(75) Inventor: Sadashi Shimoda, Chiba (JP)

(73) Assignee: Seiko Instruments Inc. (JP)

( * ) Notice: Subject to any disclaimer, the term of this patent is extended or adjusted under 35 U.S.C. 154(b) by 115 days.

(21) Appl. No.: 13/479,817

(22) Filed: May 24, 2012

(65) Prior Publication Data

US 2012/0305370 A1 Dec. 6, 2012

(30) Foreign Application Priority Data

Jun. 1, 2011 (JP) ................. 2011-123326

(51) Int. Cl.
*H01H 35/02* (2006.01)
(52) U.S. Cl.
USPC .................................. 200/61.45 R
(58) Field of Classification Search
USPC ...... 200/61.45 R, 61.46, 61.52, 61.53, 61.55; 307/121; 350/669
See application file for complete search history.

(56) References Cited

U.S. PATENT DOCUMENTS

| | | | | |
|---|---|---|---|---|
| 2,503,950 | A | * | 4/1950 | Johnson ...................... 200/80 R |
| 5,450,049 | A | * | 9/1995 | Bachmann ................... 335/205 |
| 6,018,130 | A | * | 1/2000 | Haack et al. ............... 200/61.52 |
| 2013/0207485 | A1 | * | 8/2013 | Shimoda et al. ............. 307/121 |

FOREIGN PATENT DOCUMENTS

| JP | 1310053 | 9/2007 |
|---|---|---|
| JP | 1340020 | 9/2008 |
| JP | 2010014532 | 1/2010 |
| JP | 2010048650 | 3/2010 |

* cited by examiner

*Primary Examiner* — Edwin A. Leon
(74) *Attorney, Agent, or Firm* — Adams & Wilks

(57) ABSTRACT

An acceleration switch has a mass body having a space inside, and a counter electrode provided in the space of the mass body. An arc-shaped beam surrounds and supports the mass body. The acceleration sensitivity threshold of the acceleration switch is determined by a cut portion in the mass body or by the area of the top surface of the mass body. In this manner, a plurality of acceleration switches each having a single acceleration sensitivity threshold, for example, in steps of 0.2 G, can be prepared.

12 Claims, 3 Drawing Sheets

ACCELERATION SWITCH

BACKGROUND OF THE INVENTION

1. Field of the Invention

The present invention relates to an acceleration switch.

2. Description of the Related Art

An omnidirectional acceleration switch as disclosed in Japanese Design Registration No. 1310053 (Reference 1), which includes a counter electrode inside amass body, has various advantages such as being used as a normally-off and omnidirectional switch and being compact because monocrystalline silicon can be used as a base for production with the use of semiconductor manufacturing technology.

If the acceleration switch is used in, for example, a portable device having only a small capacity battery to save power, the system can be turned off when a human vibration is not detected, that is, when not in use, and the system can be automatically turned on upon detection of vibration, that is, when in use. The wasted use of a battery can therefore be avoided.

In order to detect vibration based on an acceleration and turn ON and OFF the system, it is desired to detect vibration in any direction, and hence an omnidirectional switch is advantageous. Accordingly, as described in Japanese Design Registration No. 1310053, it is desired to support a weight (mass body) by a plurality of beams so that the vibration of the weight may not be one-sided depending on the acceleration.

Such switch is installed in a portable device and the portable device is now downsized more, and hence it is advantageous that the switch has smaller dimensions. Being smaller in dimensions is advantageous also in terms of cost because a manufacturing method therefore typically uses a semiconductor process.

However, in turning ON and OFF the system in response to detection of vibration or acceleration, the magnitude of vibration or acceleration varies depending on applications. For example, in the case of a device such as a pedometer, an acceleration of no more than 2 G is generated in the device, and hence a switch which shows a response to an acceleration of about 1.5 G is required as an acceleration switch for activation. In the case of a mouse for a personal computer, it is necessary to respond to a slight movement of a hand and hence a switch which shows a response to an acceleration of about 0.5 G is required.

An acceleration sensor has met such various requirements on acceleration. Therefore, the acceleration sensor itself has been required to be driven all the time in order to constantly detect an acceleration. However, the acceleration sensor has large current consumption, and there is a drawback that the life is significantly shortened in the case of a battery-driven portable device.

SUMMARY OF THE INVENTION

It is therefore an object of the present invention to provide an acceleration switch having a single acceleration sensitivity threshold, lower current consumption, and smaller fluctuations.

The present invention provides an acceleration switch, including: amass body having a space inside; an arc-like beam, which supports the mass body and is disposed so as to surround the mass body; and a counter electrode provided in the space of the mass body, in which the acceleration switch is produced to have an acceleration sensitivity adjusted by varying a volume of the mass body. With this, a plurality of the acceleration switches each having a single acceleration sensitivity threshold, for example, in steps of 0.2 G can be prepared, and the acceleration switches having different sensitivities can be supplied to a user.

A specific method of varying the volume of the mass body is to change a surface area of the XY plane of the mass body. Another specific method is to remove part of the mass body by etching.

Alternatively, through the change of the dimensions of the arc-like beam or the interval between the mass body and the counter electrode, a plurality of acceleration switches each having a single acceleration sensitivity threshold, for example, from 0.1 G to 2 G in steps of 0.2 G can be prepared. In this way, the acceleration switches having different sensitivities can be supplied to a user.

According to the present invention, the acceleration switch having a single acceleration sensitivity threshold, lower current consumption, and smaller fluctuations can be provided.

DETAILED DESCRIPTION OF THE PREFERRED EMBODIMENT

Hereinafter, an embodiment of the present invention is described with reference to the accompanying drawings.

First, the configuration and operation of an acceleration switch disclosed in Japanese Design Registration No. 1310053 are described.

Figure 5:
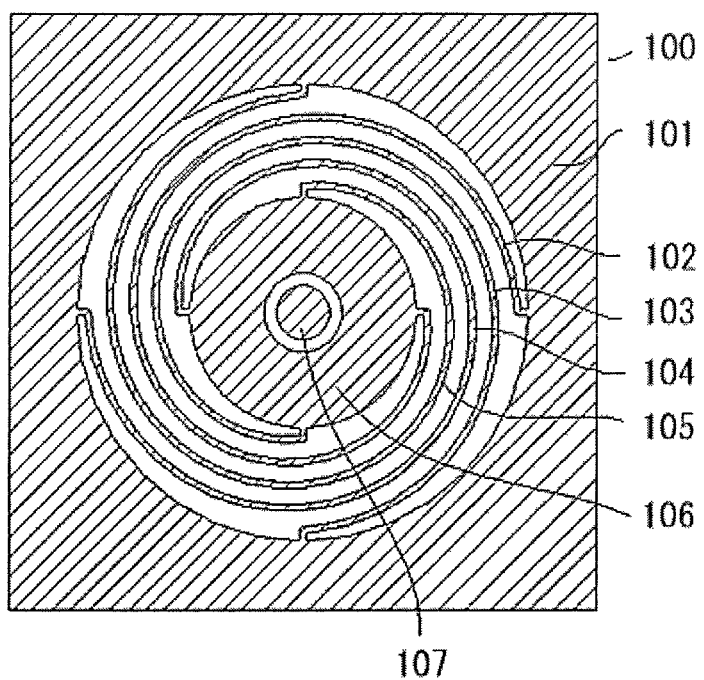
FIG. 5 is a view illustrating an embodiment of an acceleration switch disclosed in Reference 1.

FIG. 5 is a top view illustrating the configuration of an omnidirectional acceleration switch 100 as disclosed in Japanese Design Registration No. 1310053, which includes a counter electrode in a space inside amass body. The acceleration switch 100 includes a peripheral portion (outer frame) 101, beams 102 to 105 for supporting a weight 106, and a counter electrode 107. However, FIG. 5 is complicated because the number of beams is as large as four, and hence detailed description is given with reference to FIG. 2 illustrating a single beam in place of FIG. 5.

Figure 2:
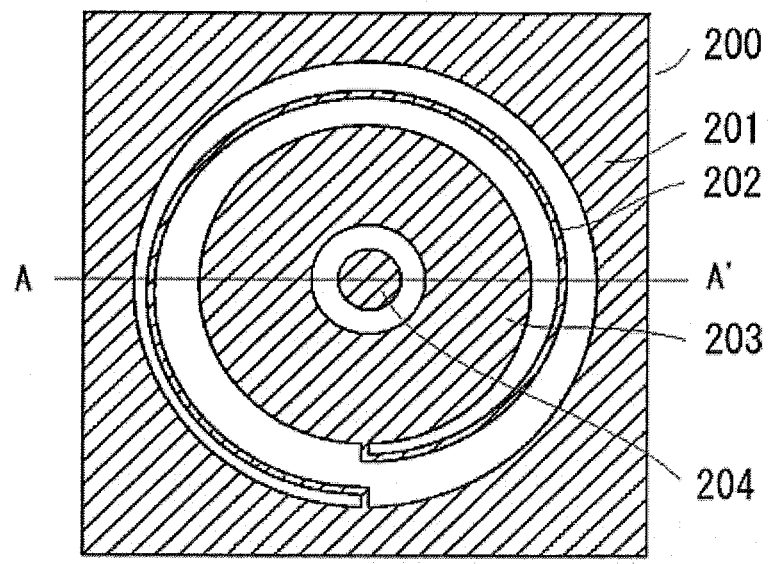
FIG. 2 is a top view illustrating the acceleration switch of the present invention.
Figure 3:
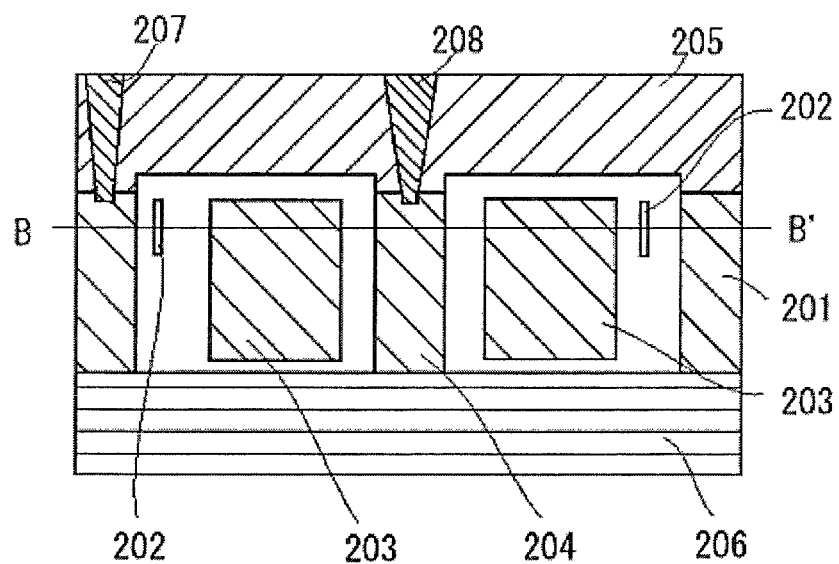
FIG. 3 is a cross-sectional view taken along the line A-A' of FIG. 2, and illustrates the configuration of the acceleration switch.

FIG. 2 is a top view of an acceleration switch 200 including a single beam as described above. In actuality however, a layer serving as a cap (first substrate) is present on the acceleration switch and a support layer (third substrate) is present thereunder. FIG. 3 is a cross-sectional view taken along the line A-A' of FIG. 2, and includes layers that are omitted in FIG. 2. FIG. 2 corresponds to a view taken along the line B-B' of FIG. 3.

As illustrated in FIGS. 2 and 3, the acceleration switch 200 is formed by laminating, from the top, a first substrate (cap layer) 205 using an insulating material such as glass, a second substrate 201 (including a beam 202, amass body 203, and a counter electrode 204) using monocrystalline silicon or the like, and a third substrate (support layer) 206 using an insulating material such as glass. As the monocrystalline silicon of the second substrate, for example, low-resistivity silicon is used in order to establish electrical conduction. Through electrodes 207 and 208 are each formed by embedding a metal such as gold into the first substrate 205, thereby serving as a contact for connecting the acceleration switch to the outside. The first substrate and the third substrate are bonded to the second substrate by anodic bonding or other methods.

Figure 4:
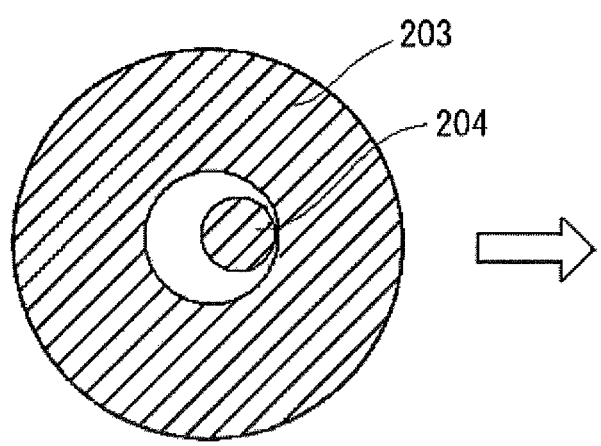
FIG. 4 is a view illustrating an operation of the acceleration switch.

When an acceleration is applied in the arrow direction illustrated in FIG. 4, the overall switch moves in the arrow direction but the mass body supported by the beam does not move, and accordingly the counter electrode 204 disposed in the space inside the mass body contacts with the mass body 203. Note that, for easier understanding, FIG. 4 omits the beam and the peripheral portion around the mass body. In this manner, electrical conduction is established from the counter electrode 204 to an external contact via the mass body 203, the beam 202, the peripheral portion of the second substrate 201, and the through electrode 207. The counter electrode 204 is connected also to an external contact via the other through electrode 208.

Accordingly, with the use of this acceleration switch as a switch for an electronic device, an electronic device such as an acceleration sensor can be activated only upon detection of vibration and the electronic device can be turned off when no vibration is being detected. Thus, the wasted use of a battery can be suppressed.

On the simulation, a displacement when an acceleration of 1 G was applied simultaneously in the Z-axis direction and the X-Y plane direction of the weight with the use of monocrystalline silicon as a material of the structure was calculated to obtain the following results.

Displacement of the weight when the beam thickness was 20 μm (unit: μm)
  Maximum displacement in X direction: 23.67
  Maximum displacement in Y direction: 3.42
Displacement of the weight when the beam thickness was 40 μm (unit: μm)
  Maximum displacement in X direction: 12.17
  Maximum displacement in Y direction: 1.87

Further, the following are results of the application of an acceleration of 1 G in the Z-axis direction and the Y-axis direction in the same manner.

Displacement of the weight when the beam thickness was 20 μm (unit: μm)
  Maximum displacement in Y direction: 23.70
  Maximum displacement in X direction: 0.65
Displacement of the weight when the beam thickness was 40 μm (unit: μm)
  Maximum displacement in Y direction: 12.09
  Maximum displacement in X direction: 0.34

The results above show that:
1) the difference between the maximum displacement in the X-axis direction when an acceleration was applied in the X-axis direction and the maximum displacement in the Y-axis direction when an acceleration was applied in the Y-axis direction was about 0.12%, and hence substantially the same displacement was developed in the X and Y directions;
2) when an acceleration was applied in the X-axis direction, the amount of displacement in the Y direction as an inclination was about 14% and 15% of the maximum displacement in the X direction, respectively; and
3) when an acceleration was applied in the Y-axis direction, the amount of displacement in the X direction as an inclination was about 2.7% and 2.8% of the maximum displacement in the Y direction, respectively.

It is found from the above results 1) to 3) that the sensitivity in the X direction and the sensitivity in the Y direction are substantially the same and that the weight is displaced naturally in the acceleration applied direction and is hardly displaced in the inclination direction. It follows that the sensitivity is sufficiently isotropic for the use of turning ON and OFF a portable electronic device in response to detection of a human movement by vibration, and hence there is no fear that the sensitivity is one-sided and is thus low or absent depending on the acceleration direction. Thus, this switch can be sufficiently used as an acceleration switch.

By the way, the acceleration switch of the present invention has a feature of having a single acceleration sensitivity. Therefore, when products having different sensitivities are commercialized as a series, the user can obtain an acceleration switch having a necessary sensitivity.

For example, it is considered the case where the acceleration switch is used as a pedometer. When a human moves to stand up, an acceleration of about 1.5 G is applied in the vertical direction. Accordingly, an acceleration switch having an acceleration sensitivity of 1.5 G is installed in the pedometer. In this case, at the moment when the human stands up, the acceleration switch is turned ON so as to detect the state in which the human stands up. If this ON-state of the acceleration switch can be detected by some means so that the acceleration sensor may be activated by the resultant signal, the counting of his/her steps can be started thereafter. Thus, the acceleration sensor can be suspended when the human is not walking, to thereby prevent battery consumption and realize a long-life pedometer.

In recent years, a wireless mouse for a personal computer has been put into the market. However, the wireless mouse consumes a battery more and requires frequent battery replacement. Aimed at preventing this, a mouse which has a built-in acceleration sensor so that the mouse is powered ON to start its operation when the mouse is moved is now available in the market. However, the acceleration sensor is expensive and has current consumption for always-on operation, and hence the user's needs are not sufficiently met at present. The use of the acceleration switch for a mouse instead of an acceleration sensor satisfies the user's needs. In an actual case, in order to detect a human operation of moving a mouse, an acceleration switch for about 0.5 G is mounted in the mouse. The acceleration switch is turned ON in response to an acceleration of the mouse in use, and the operation of a wireless circuit is started only by the resultant detection signal. Thus, current consumption when not in use can be cut.

In order to meet the user's needs described above, for example, if products with different sensitivities from 0.1 G to 2 G in steps of 0.2 G are prepared, it is possible to easily obtain an element having a necessary acceleration sensitivity threshold, without creating a circuit for adjusting the acceleration sensor to have a necessary sensitivity by his/herself. In order to realize this, it is necessary to vary dimension parameters of the switch element. Now, how the dimension parameters affect the acceleration sensitivity is considered.

The parameters of the element which affect the acceleration sensitivity are an electrode interval, dimensions of the beam, and the weight of the weight. Hereinafter, the relationships between the electrode interval, the dimensions of the beam, and the weight of the weight, and the sensitivity are described.

First, the relationship between the electrode interval and the sensitivity is described. The sensitivity of the switch depends on the displacement of the weight and the distance of the electrode interval. In the switch of the present invention, the distance between the center electrode and the inside of the weight corresponds to the electrode interval. For example, when an acceleration of 1 G is applied to the switch and the weight is displaced by 10 μm, if the electrode interval is 10

μm, both the electrodes are brought into contact with each other to turn ON the switch, and a signal can be detected. In this case, it can be said that the switch has a sensitivity of 1 G. If the electrode interval is 5 μm in this case, both the electrodes are brought into contact with each other with a half displacement amount, namely a half acceleration of 0.5 G, and hence it can be said that the switch has a sensitivity 0.5 G. As described above, the electrode interval and the sensitivity has a direct proportional relationship.

Etching for such small electrode interval needs to be performed with high accuracy. In silicon MEMS process, the Bosch process, being a type of dry etching, is typically used, but there is a constraint. The Bosch process involves a phenomenon such as side etching or scalloping, which affects the dimension accuracy. As a result, fluctuations occur among the electrode intervals. The fluctuations in electrode interval lead to fluctuations in sensitivity as described above. In order to avoid this influence, a realistic electrode interval is considered to be about at least 3 μm, and about 5 to 10 μm in consideration of the manufacturing reproducibility and the manufacturing accuracy.

It is understood from the above that the sensitivity of the switch can be changed merely by changing the electrode interval. In the case where the electrode interval is 10 μm and the processing accuracy fluctuates by 0.5 μm among products because of a phenomenon such as side etching or scalloping, the sensitivity fluctuates by 5% with respect to 1 G. If the electrode interval is changed to be 5 μm, the processing accuracy fluctuation of 0.5 μm leads to a sensitivity fluctuation of 10% with respect to 0.5 G. In other words, the sensitivity of the switch can be changed through the change of the electrode interval. However, the products may vary in fluctuation amount with respect to a target sensitivity value.

Next, the relationship between the dimensions of the beam and the sensitivity is described.

In the structure of the switch of the present invention, the sensitivity is in inverse proportion to a spring constant of the beam portion. A spring constant k is expressed by the following Expression (1):

[Ex. 1]

$$k = \frac{2Ew}{3}\left[\frac{t}{L}\right]^3 \quad (1)$$

where E represents Young's modulus, w represents a beam thickness, t represents a beam width, and L represents a beam length.

That is, the following is derived from Expression (1).
1. The sensitivity is linearly proportional to the beam thickness. As the beam becomes thicker, the spring constant becomes larger and the sensitivity deteriorates.
2. The sensitivity is proportional to the third power of the beam width. As the beam width becomes larger, the spring constant becomes larger and the sensitivity deteriorates.

It is understood from the above that the change in beam width can change the sensitivity most greatly. Therefore, through the change of the beam width for each switch, it is possible to commercialize switch products having different acceleration sensitivities. On the contrary, however, the fluctuations in beam width are increased to fluctuate the sensitivity greatly. As described above, due to a phenomenon such as side etching or scalloping, the difference in beam width leads to the fluctuations in processing accuracy. As a result, the sensitivity also fluctuates in proportion to the third power of the beam thickness.

Regarding the thickness of the beam, for example, if a silicon on insulator (SOI) wafer is used, an active layer thereof can be used as the thickness of the beam, and hence there remains only a slight constraint on the dimensions and the dimension accuracy can be maintained. Accordingly, if wafers having different thicknesses of active layers are used to vary the thickness of the beam for each switch, it is possible to commercialize switch products having different acceleration sensitivities. However, it is necessary to prepare SOI wafers having different thicknesses of active layers 209 for manufacture of products having different sensitivities.

Next, the relationship between the weight of the weight and the sensitivity is described.

The weight of the weight is determined by the volume of the mass body 203, which is the product of the thickness of a silicon wafer and the surface area of the XY plane of the mass body 203 illustrated in FIG. 4.

First, the thickness of the silicon wafer directly corresponds to the thickness of the weight, and hence, as the thickness of silicon itself becomes larger, the displacement amount becomes larger to result in higher sensitivity. In this case, however, there is a constraint on dry etching treatment. For etching of the silicon, the Bosch process, being a type of dry etching, can be applied to perform high-speed etching on thick silicon. However, if the silicon is too thick, even when the Bosch process is used, it takes much time for silicon etching treatment, resulting in increased cost and difficulty in controlling the dimensions and shape of the weight. It is therefore desired to use a silicon wafer having a thickness of about 350 μm.

Next, the surface area of the XY plane of the mass body 203 is determined as follows. The switch peripheral portion needs to be secured as a bonding region for anodic bonding or the like. As the region becomes larger, anodic bonding is performed more stably. When a bonding margin is provided as about 20% of a 1 mm square, namely 100 μm on each side, that is, a region of about 200 μm in total on both sides of the chip is secured at the chip peripheral portion, the peripheral diameter dimension of the mass body 203 is about 800 μm.

The weight of the weight is in proportion to the acceleration sensitivity. In other words, as the weight becomes heavier, the acceleration sensitivity is improved. That is, the acceleration sensitivity can be changed through the change in surface area of the XY plane of the mass body 203 or the change in thickness of the silicon wafer. It is necessary to prepare wafers having different silicon thicknesses for manufacture of products having different sensitivities.

On the other hand, the method of varying the surface area of the XY plane is effective. The reason is as follows. Dry etching of the Bosch process is used for processing that determines the surface area. Even if the surface area of the XY plane thereof is varied, the etching conditions are not changed. Therefore, even if the surface area is varied, the fluctuations caused by a phenomenon such as side etching or scalloping are constant. Besides, even considering the processing accuracy fluctuation of 0.5 μm among products, there is little influence on the radius of the periphery of the mass body 203. For example, in the case of a mass body having a radius of 400 μm, the sensitivity fluctuates only by 0.25%. In the case of a mass body having a radius of 200 μm, the sensitivity fluctuates by 0.5%. Accordingly, even if the radius is halved to reduce the sensitivity to ¼, the fluctuations thereof fall within 0.25%. In other words, the fluctuations between products whose sensitivity is 2 G and products whose sensitivity is 0.5 G fall within 0.25%.

Figure 1:
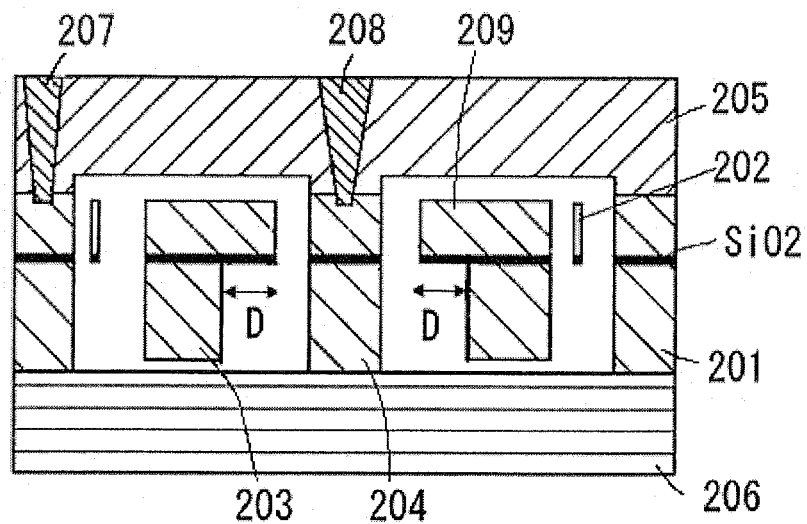
FIG. 1 is a cross-sectional view of an acceleration switch according to an embodiment of the present invention.

In addition, the same or greater effect can be obtained even by etching an inner cut portion D of the mass body 203 to provide a recess in the mass body as illustrated in FIG. 1. That is, because the acceleration sensitivity is in inverse proportion to the weight of the mass body 203, the sensitivity can be varied by etching the inner cut portion D to vary the weight of the mass body 203. Specifically, as the inner cut portion D becomes larger, the weight of the mass body 203 becomes lighter and the acceleration sensitivity deteriorates. This etching can be performed at the same time when the mass body 203 is formed by etching. Therefore, there is another advantage that the number of steps is not increased and the through rate is not deteriorated. Further, as compared to the method of varying the surface area of the mass body 203, this method does not vary the radius of the periphery of the mass body 203, and hence there is still another advantage that the sensitivity fluctuations can be suppressed more. In addition, although the inner portion of the mass body 203 is described as the cut portion, the effects are not changed even if an outer portion or an intermediate portion between the outside and the inside is subjected to etching.

Note that, in the present invention described above, a plurality of sensitivities are prepared from 0.1 G to 2 G in steps of 0.2 G, but this numerical range is not limited.

As described above, according to the present invention, the acceleration switch having a single acceleration sensitivity threshold, lower current consumption, smaller fluctuations, and a different sensitivity can be provided with ease.

What is claimed is:

1. An acceleration switch having a single acceleration sensitivity, comprising:
    a mass body having a space inside;
    a beam supporting the mass body and disposed so as to surround the mass body; and
    a counter electrode provided in the space of the mass body;
    wherein the mass body has an inner cut portion on an inside portion thereof, and the inner cut portion faces the counter electrode; and
    wherein the inner cut portion determines the single acceleration sensitivity.

2. An acceleration switch according to claim 1;
    wherein the mass body has two opposed surfaces which define therebetween the thickness of the mass body, and the inner cut portion extends in the thickness direction of the mass body from one surface toward the other.

3. An acceleration switch according to claim 2;
    wherein the beam has an arc-shaped configuration.

4. An acceleration switch having a single acceleration sensitivity, comprising:
    a mass body having a lateral top surface with a predetermined area and a uniform thickness, and having a space inside;
    a beam supporting the mass body and disposed so as to surround the mass body; and
    a counter electrode provided in the space of the mass body;
    wherein the mass body has a volume equal to the product of the area of the lateral top surface and the uniform thickness; and
    wherein the area of the lateral top surface determines the single acceleration sensitivity.

5. An acceleration switch according to claim 4; wherein the beam has an arc-shaped configuration.

6. An acceleration switch having a predetermined acceleration sensitivity threshold, comprising:
    a mass body having a space inside;
    an electrode extending into the space of the mass body; and
    a beam substantially surrounding the mass body and supporting the mass body for movement into contact with the electrode in response to acceleration of the acceleration switch,
    wherein a recess is provided in the mass body to set the acceleration sensitivity of the acceleration switch to a predetermined acceleration sensitivity threshold.

7. An acceleration switch according to claim 6; wherein the recess extends completely around the mass body.

8. An acceleration switch according to claim 7; wherein the recess is provided on an inside portion, an outside portion, or an intermediate portion between the outside and the inside portions of the mass body.

9. An acceleration switch according to claim 8; wherein the recess has a uniform shape.

10. An acceleration switch according to claim 7; wherein the recess is provided on an inside portion of the mass body and faces the electrode.

11. An acceleration switch according to claim 6; wherein the mass body has two opposed surfaces which define therebetween the thickness of the mass body, and the recess extends in the thickness direction of the mass body from one surface toward the other.

12. An acceleration switch according to claim 6; wherein the beam has an arc-shaped configuration.

* * * * *